(12) United States Patent
Caze et al.

(10) Patent No.: US 8,534,307 B2
(45) Date of Patent: Sep. 17, 2013

(54) METHODS AND DEVICES FOR FLUID HANDLING

(75) Inventors: Philippe Caze, Fontainebleau (FR); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 346 days.

(21) Appl. No.: 13/060,372

(22) PCT Filed: Aug. 28, 2009

(86) PCT No.: PCT/US2009/004921
§ 371 (c)(1),
(2), (4) Date: Apr. 12, 2011

(87) PCT Pub. No.: WO2010/024935
PCT Pub. Date: Mar. 4, 2010

(65) Prior Publication Data
US 2011/0290351 A1   Dec. 1, 2011

Related U.S. Application Data

(60) Provisional application No. 61/190,551, filed on Aug. 30, 2008.

(51) Int. Cl.
*F15D 1/00* (2006.01)
(52) U.S. Cl.
USPC ............... 137/15.18; 137/560; 29/890.09
(58) Field of Classification Search
USPC ..... 137/1, 15.18, 560, 625.4, 269; 29/890.09
See application file for complete search history.

(56) References Cited

U.S. PATENT DOCUMENTS

| 510,860 A | 12/1893 | Heermans |
| 4,032,454 A | 6/1977 | Hoover et al. .............. 210/323 |
| 4,781,831 A | 11/1988 | Goldsmith .................. 210/247 |
| 5,415,233 A | 5/1995 | Roussakis et al. ............ 169/48 |
| 5,641,332 A | 6/1997 | Faber et al. ................. 55/523 |
| 5,855,781 A | 1/1999 | Yorita et al. ............ 210/321.82 |

(Continued)

FOREIGN PATENT DOCUMENTS

| CN | 1278454 | 1/2001 |
| CN | 1674980 | 4/2008 |
| EP | 1413343 | 4/2004 |
| WO | 2010/002362 | 1/2010 |

OTHER PUBLICATIONS

Patent Office of the China State Intellectual Property Office; Notice on the First Office Action; Date of Dispatch: Jan. 6, 2013; pp. 1-3.

(Continued)

*Primary Examiner* — Kevin Lee
(74) *Attorney, Agent, or Firm* — Gregory V. Bean (57) ABSTRACT

A device is provided for delivering fluids to, or removing fluids from, one or more fluid streams, the device having a body having a plurality of channels extending through the body from a first to a second end of the body, the body having one or more internal passages therein extending in a direction crossways to the plurality of channels. Each channel is in fluid communication with one or more of the passages via a porous wall between the respective channel and an associated passage. The one or more passages are in fluid communication with the exterior of the body.

10 Claims, 7 Drawing Sheets

(56) References Cited

U.S. PATENT DOCUMENTS

| | | |
|---|---|---|
| 6,077,436 A | 6/2000 | Rajnik et al. .................. 210/650 |
| 6,126,833 A | 10/2000 | Stobbe et al. ................. 210/650 |
| 6,461,406 B1 | 10/2002 | Sakai et al. ....................... 95/45 |
| 6,695,967 B2 | 2/2004 | Bishop et al. ............. 210/510.1 |
| 6,921,483 B2 | 7/2005 | Goldsmith .................... 210/601 |
| 6,936,561 B2 | 8/2005 | Marques et al. ................ 502/64 |
| 7,032,894 B2 | 4/2006 | Adusei et al. .................. 261/97 |
| 7,037,615 B2 * | 5/2006 | Grieve et al. ................. 137/99.5 |
| 7,169,213 B2 | 1/2007 | Liu et al. ............................. 96/4 |
| 2009/0169445 A1 | 7/2009 | Caze et al. ..................... 422/222 |
| 2010/0326532 A1 | 12/2010 | Caze et al. ........................ 137/1 |

OTHER PUBLICATIONS

"Improving flooding performance for countercurrent monolith reactors"; Heibel et al; 2004 American Chemical Society; 43; 4848-4855.

\* cited by examiner

METHODS AND DEVICES FOR FLUID HANDLING

PRIORITY

This application claims priority to U.S. Provisional Patent Application No. 61/190,551, filed Aug. 30, 2008, titled "Methods and Devices for Fluid Handling" the content of which is relied upon and incorporated herein by reference in its entirety.

The present application is related in part to application number EP08305041 filed 29 Feb. 2008 entitled "Methods and Devices for Falling Film Reactors with Integrated Heat Exchange" and to U.S. Provisional Application Ser. No. 60/921,053, filed 31 Mar. 2007 entitled Honeycomb Continuous Flow Reactor and to U.S. Provisional application 61/018,119 filed 31 Dec. 2007 entitled Devices and Methods for Honeycomb Continuous Flow Reactors.

BACKGROUND

The present invention relates to a methods and devices for fluid handling in the form of introducing or extracting fluids from one or more fluid streams, particularly useful with extruded monolith or "honeycomb" type reactors and extruded monolith or "honeycomb" type falling film reactors.

SUMMARY

According to one aspect of the invention, a device is provided for delivering fluids to, or removing fluids from, one or more fluid streams. The device comprises a body having a plurality of channels extending through the body from a first to a second end of the body. The body also has one or more internal passages therein extending in a direction crossways to the plurality of channels. Each channel is in fluid communication with one or more of the passages via a porous wall between the respective channel and an associated passage. The one or more passages are in fluid communication with the exterior of the body.

According to another aspect of the invention, a method of forming a device for injecting fluids into, or extracting fluids from, one or more fluid streams, is provided. The method comprises the step of providing a porous extruded body having multiple channels extending through said body from a first end to a second end thereof, and the step of removing selected interior walls of the porous body so as to join selected ones of the channels so as to produce one or more lateral passages extending in a direction crossways to the direction of the channels. The method further comprises the step of plugging the top and bottom of the lateral passages to form enclosed lateral passages.

Additional variations and features of the present invention are described below in connection with the figures, of which:

DETAILED DESCRIPTION

Whenever possible, the same reference numerals will be used throughout the drawings to refer to the same or like parts. Features described as desirable are preferred but optional, representative of variations of the invention.

The terms extruded monolith, extruded body, and honeycomb are used interchangeably herein to refer to honeycomb structure having a plurality of parallel channels or cells extending along a common direction. While extruded bodies are currently preferred and will be used to describe the present invention, the invention may alternatively be useful with honeycomb structures produced by other methods.

The present invention includes, in one aspect, a method of forming a device for injecting fluids into, or extracting fluids from, one or more fluid streams, and the device resulting, described below with reference to FIGS. 1A-1C and FIGS. 2A-2B and FIG. 3.

FIGS. 1A-1C are perspective views of certain steps in the preparation of a body device useful according to the present invention as a device for injecting fluids into, or extracting fluids from, one or more fluid streams. Initially a honeycomb body 40 is provided, such as by forming via extrusion or other suitable means, and then desirably kept in the green state through the steps shown in FIGS. 1A and 1B. The body 40 has multiple channels 86 extending through the body 40 from a first end 80 to a second end 82 thereof. The body 40 is comprised of a material that is porous after sintering, although it may not be porous in the green state. Methods and materials for producing such bodies are known in the art of ceramic honeycomb extrusion. Suitable materials can include, but are not limited to, cordierite, aluminum titanate, silicon carbide, alumina, and so forth. As further recognized in the art of ceramic honeycomb extrusion, porosity after firing may be produced by the use of pore formers in the form of organic particles that burn out on sintering, or by any other suitable means.

As will be explained below, the cell pitch, wall thickness and diameter of the porous body 40 may be selected to match, in final fired form, the cell pitch and wall thickness and diameter of a body of multichannel extruded body reactor, such as a falling film reactor.

The porous body 40 is preferably of relatively thin but uniform thickness in the direction of the channels from the first end 80 to the second end 82. For example, the body may be in the range of 3-15 mm thick, more preferably about 5-8 mm thick. A green extruded body may be sawn to a size in this range, for example. For use in the context of falling film reactors, the pore size of the pores of the porous body 40 should be selected to be small enough after the extruded body is sintered so that flame propagation through the walls of the extruded body 40 is suppressed, preferably completely prevented.

Figure 1:
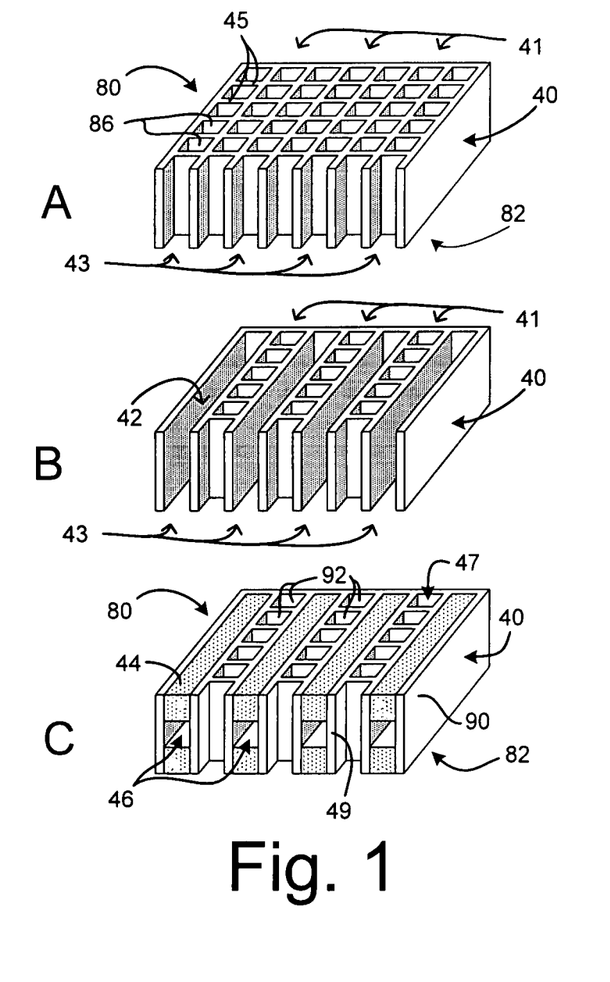
FIGS. 1A-1C are perspective views of steps in the preparation of a porous extruded body 40 for use as a fluid source or fluid extractor in various types of fluid processing according to one embodiment of the present invention.
Figure 2:
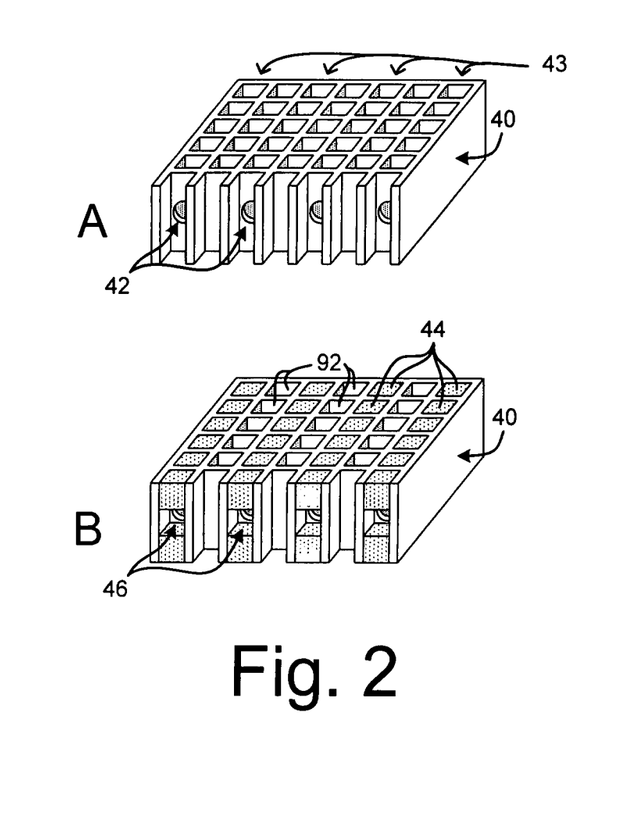
FIGS. 2A-2B are perspective views of alternative steps in the preparation of a porous extruded body 40 for use as a fluid source or fluid extractor in various types of fluid processing according to one embodiment of the present invention.

Desirably while the body 40 is still in the green state, selected cell walls 45, in this case those positioned between cells of the odd numbered rows 43, are breached so as to join selected ones of channels 86 so as to produce one or more open lateral passages 42 extending in a direction crossways to the direction of the channels. Breaching may be performed, for example, by removing the walls by machining them away, as shown in FIG. 1B. Machining may be performed in any suitable manner, such as wire saw cutting, laser cutting, water jetting, or the like. Alternatively, breaching may be performed by drilling holes 200 through the row, as shown in FIG. 2A. Removing walls as in FIG. 1B can allow for complex patterns, but drilling as in FIG. 2A may be preferred for ease of execution, if the depth of drilling required is not too deep. In either case, selected ones of the channels 86 are thus joined by the breached walls, so as to produce one or more open lateral passages 42 extending in a direction crossways to the direction of the channels, as shown in FIGS. 1B and 2A. In the embodiments shown in FIGS. 1 and 2, the lateral passages 42 are formed in the odd numbered rows 43. Machining can be used remove cell walls completely, as shown in FIG. 1B, or may only remove walls to a significant degree, such as 60-80%, leaving shortened walls in place (not shown) if needed to help preserve the stability of the extruded body 40, or for any other desirable reason.

Next the lateral passages 42 are plugged at the top and bottom thereof with a non-porous plugging material 44, as shown in FIGS. 1C and 2B. The plugs may be positioned level with the top and bottom ends 80 and 82 of the body 40, and have plugging depth limited such that enclosed lateral passages 46 are formed between the respective opposing walls of the body 40 and the respective upper and lower plugs 44 within the formerly open passages 42. As mentioned the body 40 is desirably an extruded green body, and as such may be plugged before sintering using green plugs, or after sintering using post-sinter-CTE matched organic plugs or inorganic epoxy plugs. Unlike the material of body 40, the plug material 44 is not porous after sintering, so that fluid does not pass the sintered plug material.

After sintering and plugging are complete, the laterally external wall 90 of the body 40 is desirably sealed by coating and/or impregnating the wall with a nonporous material.

Figure 3:
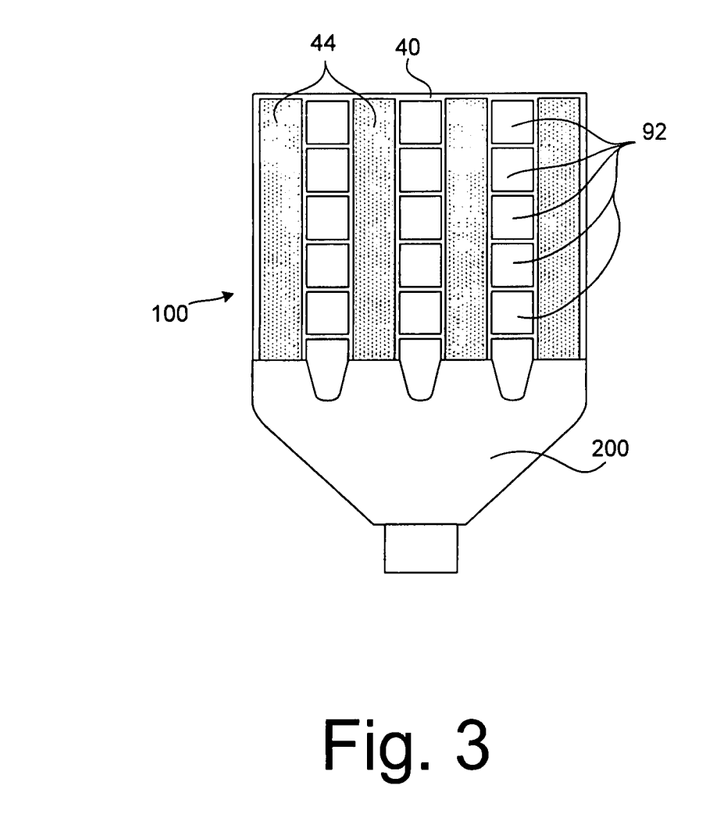
FIG. 3 is a plan view of the device 100 of FIG. 1C with a manifold 200 attached.

The resulting device or structure 100, seen in FIG. 1C and in alternative form in FIG. 2B and in plan view with a manifold 200 in FIG. 3, is useful for providing fluids to, or removing fluids from, one or more fluid streams. As may seen from the figures and recognized from the above description, the resulting device 100 includes a body 40 having a plurality of channels 92 extending through the body from a first end 80 to a second end 82 thereof (the unplugged ones of channels 86, corresponding to the even-numbered rows 41), the body 40 further having one or more internal passages 46 formed therein extending in a direction crossways to the plurality of channels 92. Because the body 40 is porous except where plugged and where coated, each channel 92 is in fluid communication with one or more of the passages 46, via a porous wall of the body 40 between the respective channel and passage. The one or more passages 46 are in fluid communication with the exterior of the body 40, either directly as in FIGS. 1C and 2B or through a manifold 100 as in FIG. 3.

Figure 4:
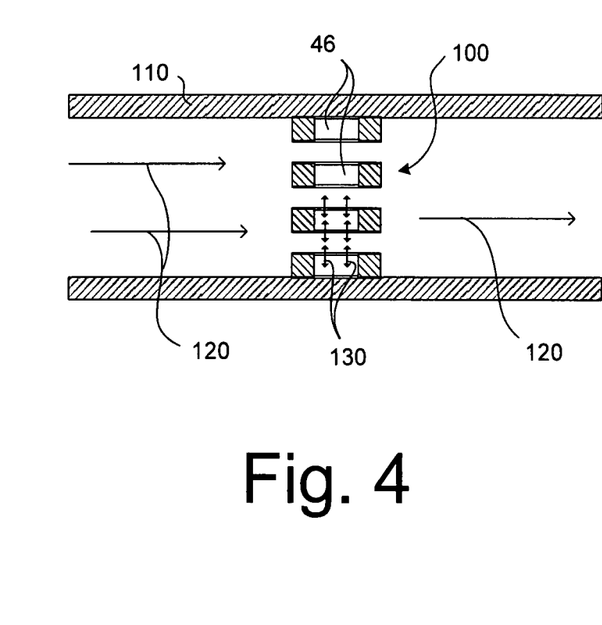
FIG. 4 is a cross section of a device 100 of FIG. 1C or 2B and 3, in used within a pipe or tubular reactor 110 according to one aspect of the present invention.

One use of devices of the type of device 100 of FIGS. 1C and 2 is shown in FIG. 4, which is a cross section of a pipe or tubular reactor 110 with a device 100 according to the present invention positioned inside the pipe 110. A first fluid represented by the arrows 120 may be flowed in the direction indicated. Through a manifold passing through an opening in the pipe or tubular reactor (not shown in the plane of FIG. 4), a second fluid may be pumped or otherwise placed under pressure within the one or more lateral passages 46. The second fluid, represented by the arrows 130, then passes through the porous walls of the device 100 as indicated by the arrowheads toward the interior of the pipe 110. Alternatively, a lower pressure in the passages 46 or overpressure in the pipe 110 can allow extraction of a fluid from the pipe 110 the passages 46. Suitable selection of the pore size and channel size can allow for various processes to be performed in this manner, including liquid or gas separation or other types of filtering, formation of emulsions, mixing, and so forth.

One particularly preferred embodiment or use of the present invention relates to methods and devices for honeycomb type reactors, particularly honeycomb type falling film reactors, and particularly to methods for providing desired fluid flow, especially a falling film liquid flow, within a honeycomb body reactor, and for removing a falling film liquid flow from a honeycomb body reactor. In this context, the and devices and methods of the present invention may be employed to perform various processes and/or reactions, including reactions typically performed in falling film reactors, such as oxidation, hydrogenation, sulfation, and sulfonation reactions, and processes such as evaporation, gas sequestration, and the like, for example.

Figure 5:
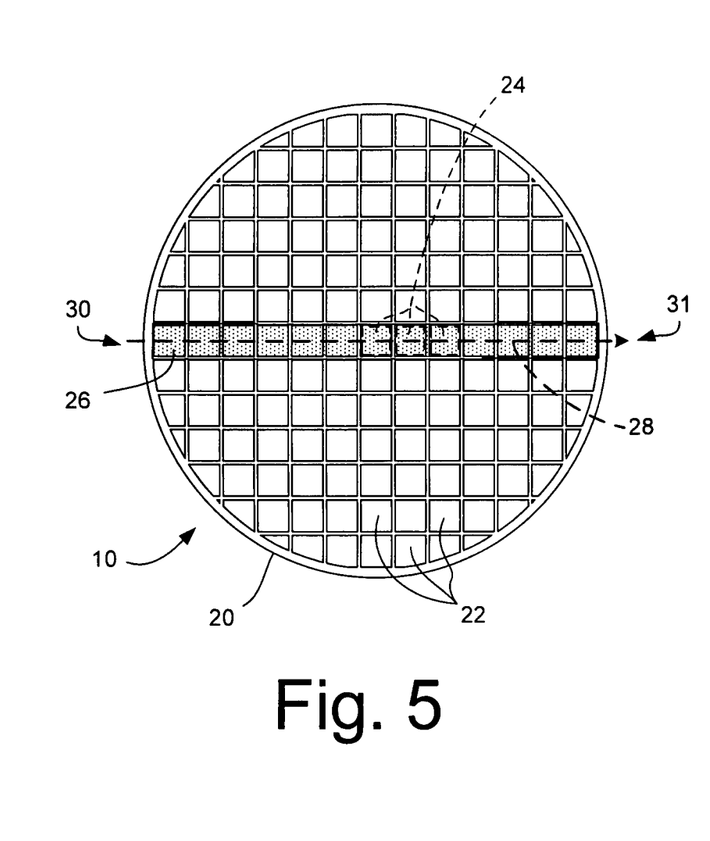
FIG. 5 is a plan view of a portion of a reactor comprising an extruded monolith or multicellular body 20 or "honeycomb" showing a fluidic path 28 in a plane perpendicular to the channels.
Figure 6:
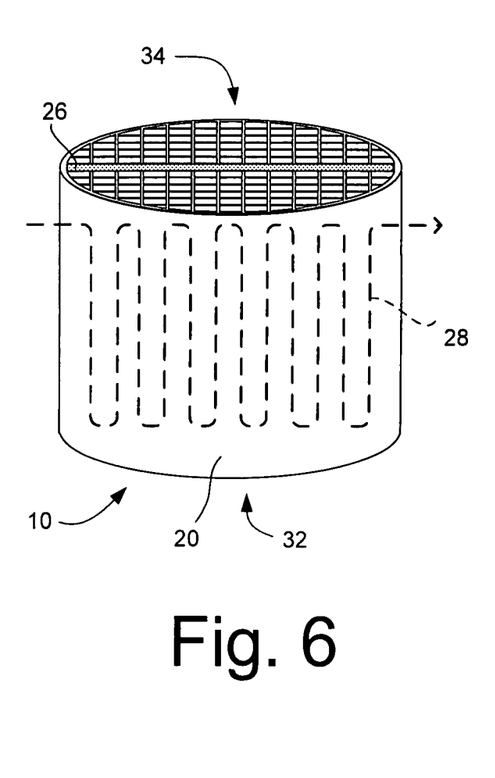
FIG. 6 is a side elevation view of the extruded body 20 of FIG. 5, showing additional detail of a fluidic path 28.
Figure 7:
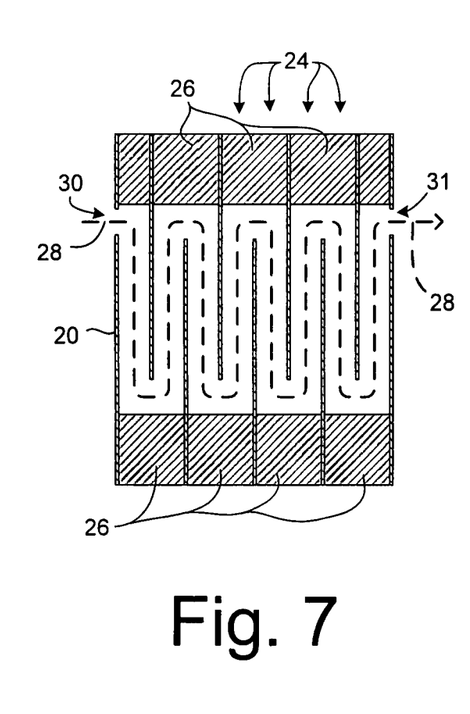
FIG. 7 is a cross-sectional view of channels closed on one or both ends of an extruded body 20, showing one method useful for interconnection between channels.

In FIG. 5 is shown a plan view, and in FIG. 6 a perspective view, of a portion of a previously developed reactor 10 useful as a falling film reactor. The reactor 10 comprises a multicellular or "honeycomb" type body 20, one embodiment of which is represented in FIGS. 4 and 5. The body 20 has a plurality of cells or channels extending in parallel in a direction from one end of the body to the other, with the cells seen end-on in FIG. 5. The channels include a first plurality of channels 22 open at both ends of the body and a second plurality of channels 24 closed at one or both ends of the body, closed in this embodiment by one or more plugs 26 or by a more or less continuous plugging material 26 disposed at or near the end of the body and at least partly within the channels of the second plurality of channels 24. The second plurality of channels 24 (the closed channels) are positioned in one or more groups of contiguous channels, one group in the case of FIG. 1, and cooperate to help define a fluidic passage 28 extending through the body 20 from an input port 30 to an output port 31 at the locations indicated, with openings not visible in the figure. The passage 28 desirably follows a serpentine path up and down along the channels 24, in the general direction shown in FIG. 3. As seen in FIGS. 5-7, the passage or path 28 desirably extends laterally perpendicular to the channels 24 only at or near the ends 32, 34 of the body 20, where walls between the channels 24 are shortened or ported or otherwise passed over or through so as to allow fluid communication between the channels 24.

Figure 8:
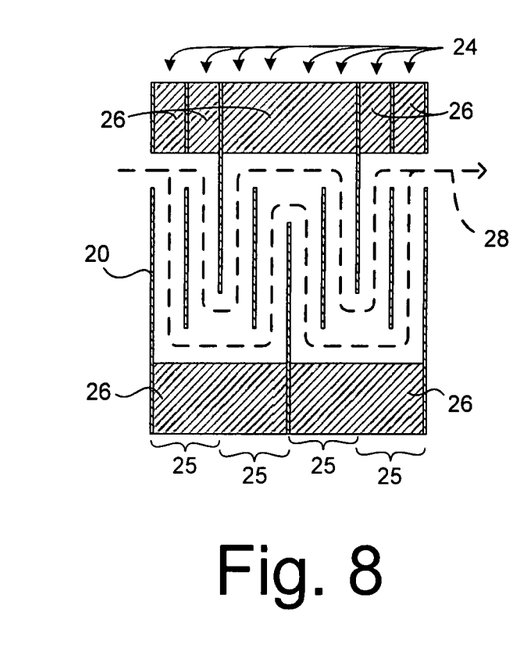
FIG. 8 is a cross-sectional view of channels closed on one or both ends of an extruded body, showing another method useful for interconnection between channels.

Particular embodiments of a body 20 having shortened walls between the channels 24 are shown in the cross sections of FIGS. 6 and 7. Cutting away or otherwise shortening the walls between adjacent channels, together with plugging, is one method of allowing the passage or path 28 to extend laterally perpendicular to the channels 24 by connecting at or near the ends of the body 20. As may be seen in FIG. 7, the path 28 may follow a single channel up and down in the direction along the channels 24. Alternatively, the path 28 may follow multiple successive respective groups 25 of two or more channels in parallel, in the direction along the channels, as shown in FIG. 8. In the embodiment shown, the path follows groups 25 of two channels in parallel, but more than two channels may be included in each group 25 if desired.

Figure 9:
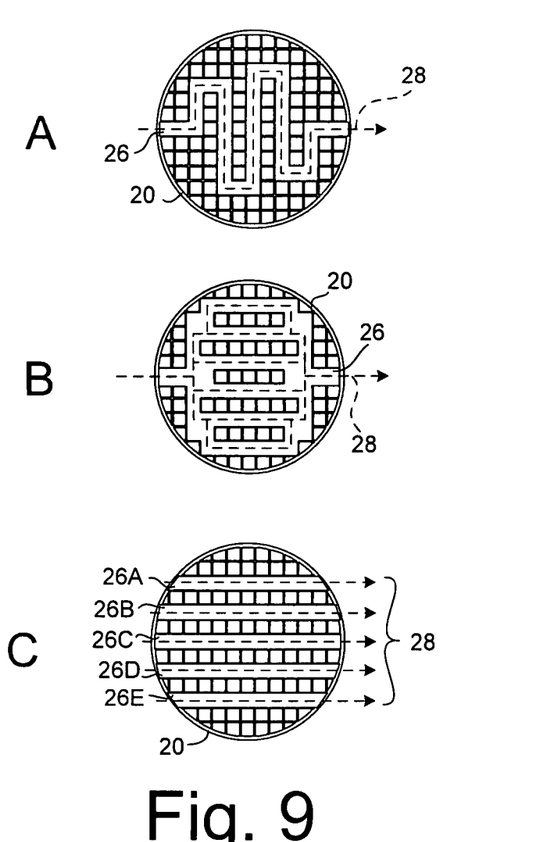
FIGS. 9A-9C are alternative plan views of an end 34 of an extruded body 20, showing alternative patterns for the plugs 26 or continuous plug material 26, corresponding to the pattern of the closed channels 24 and path 28 beneath.

Three alternative paths or passages 28, from among many potential alternatives, are shown in plan view in FIGS. 8A-8C. In the embodiment shown in FIG. 9A, the path is not only serpentine in the direction along the channels as shown in FIG. 6 (and FIGS. 6 and 7), but also in the plane perpendicular to the channels. The fluid path 28 of FIG. 9A is thus "doubly serpentine," or serpentine at a relatively higher frequency in the direction in and out of the plane of FIG. 9A, and at a relatively lower frequency within the plane of the figure. As shown in FIGS. 8B and 8C, the path 28 may also be made parallel, internally as in FIG. 9B or externally as in FIG. 9C, with separate sets of continuous plugging material 26A-E or groups of plugs 26A-E. In every case, the path or passage 28 as in FIGS. 8A and 8B, or the multiple paths or passages 28 as in FIG. 9C, all extend through the body 20 laterally from channel to channel within channels of the second plurality of channels 24, that is, the closed channels 24 corresponding to those indicated in FIG. 5.

Regardless of the shape of the path 28 within the plane perpendicular to the direction of the channels, it is desirable that the majority of the path or passage 28 be only one channel wide in said plane. This results in an easily manufactured fluidic path capable of having very high shared surface area with the channels of the first plurality 22, that is, the open channels 22. It is likewise preferable that the open channels 22, positioned between rows of the path or passage 28, be arranged in groups only one channel wide, as in FIGS. 8B and 8C. This provides for a fluid path through the open channels that has a high surface to volume ratio. Path(s) 28 may however, if desired, be more than one channel wide, as may the groups of open channels.

The extruded body or honeycomb 20 is desirably formed of an extruded glass, glass-ceramic, or ceramic material for durability and chemical inertness. Alumina ceramic is generally presently preferred as having good strength, good inertness, and higher thermal conductivity than glass and some ceramics, but other ceramics such as cordierite, silicon carbide, aluminum titanate, and still others may be applied.

Figure 10:
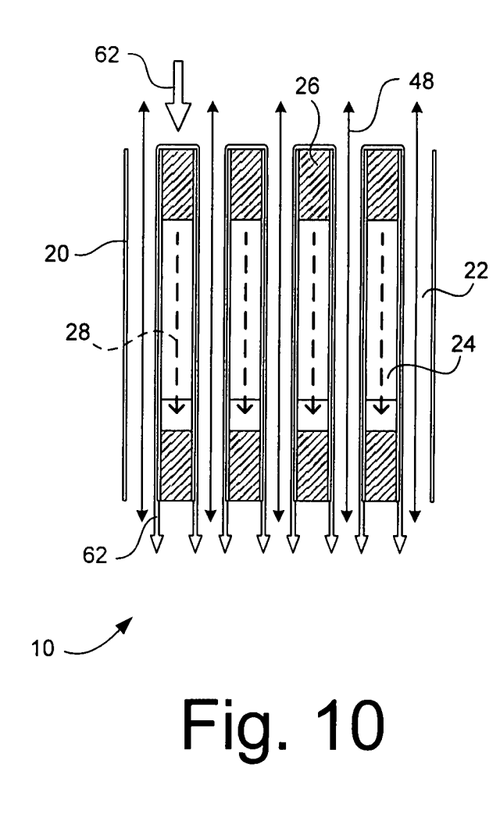
FIG. 10 a cross section of an extruded body 20 like those of FIGS. 5-9, showing locations of liquid and gas reactant and heat exchange fluid for use in falling film gas-liquid reactions.

Honeycomb type bodies 20 such as those shown and described above with respect to FIGS. 4 through 8 can be useful as falling film reactors, as shown in the cross-section of FIG. 10, in which a reactor 10 is shown, illustrating the use of such a body 20 to perform a falling film gas-liquid reaction. A liquid reactant stream 62 is delivered to the surface of the plugs 26 or continuous plugging material 26, or in other words, to the surface above the closed channels 24 of the body 20. As shown in the cross section of FIG. 7, the liquid reactant stream 62 then follows the path indicated in the direction indicated by the arrowheads on the arrows representing the liquid reactant stream 62, flowing over the edges of the closed channels of the body 20, and then down the inside surfaces of the open channels as a falling liquid film. Gaseous reactant stream 48 flows in the center of the open channels, in co- or counter-current flow, as may be desired, while a heat exchange or other thermal control fluid is flowed along passage 28, which then becomes a thermal control fluid passage 28. The heat exchange fluid may optionally be in the form of a phase-transforming fluid or in the form of a reactant stream providing a reaction that acts as a heat source or sink.

Optimal delivery of fluid 62 is important. Uniform reaction or other processing conditions depend on uniformity of flow and uniformity of film thickness of the falling films in each of the open channels. The present invention can provide a liquid source or liquid delivery system for generating a uniform falling film liquid flow 62 for the reactor of FIG. 7 or for reactors with similar geometries and flow patterns, and can also provide a liquid separator or sink for removing liquid from the reactor 10 of FIG. 7, or from reactors with similar geometries and flow patterns.

Figure 11:
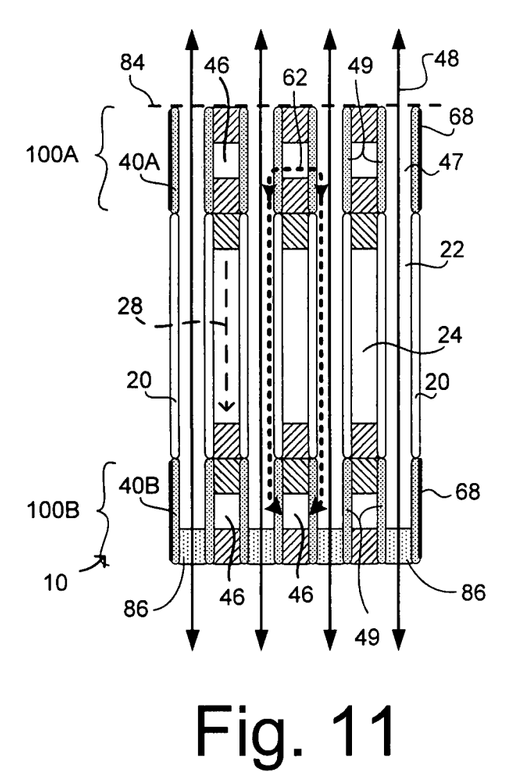
FIG. 11 is a cross-sectional view showing a reactor according to one embodiment of the present invention.

FIG. 11 is a cross-section showing the integration of two porous fluid delivery and extraction devices 100A and 100B like those described and shown in FIGS. 1-3 above, integrated with a non-porous extruded body 20 to form a falling film reactor 10. When liquid is fed under pressure into the lateral internal passages 46 of the finished upper porous body 40A (via an external or an integrated fluidic manifold, not shown) the liquid can only escape within the upper body 40A by flowing through the porous walls of the body and into the axially-oriented open channels 92. A fluid film is thus formed on the inner surfaces of the open channels 92 and a controlled and uniform falling film flow 62 is established. If a lower pressure is generated in the lateral internal passages 46 of the lower porous body 40A, the falling film flow can be drawn from the open cells 92 of the lower body 40A into the lateral internal passages 46, and may be removed from the reactor 10. Thus upper body 40A forms a fluid or liquid delivery structure or falling film source 100A, while the lower body 40B forms a fluid or liquid removal structure or falling film sink 100B.

As may be understood from FIGS. 1A-1C and 2, the method of fabrication described produces can produce devices 100A, 100B for providing fluids to, or removing fluids from, a multichannel honeycomb reactor 10. The reactor itself has a channel pattern, such as the various patterns of open and closed channels of FIGS. 8A-8C. Fluid introducing or fluid removing device 100A, 100B includes a multicellular body 40A, 40B that in final form is no longer porous except in certain desired places. The bodies 40A, 40B have a plurality of channels, open channels 92, which extend along a common direction and are desirably arranged in a pattern corresponding to at least a portion of the channel pattern of open channels 22 of body 20. The bodies 40A, 40B have one or more enclosed passages 46, each passage extending in a direction crossways to the common direction of the channels 92 in the bodies 40A, 40B with each of the channels 92 being in fluid communication with one or more of the passages 46 via a porous wall 49 positioned therebetween; the one or more internal passages 46 being in fluid communication with the exterior of the bodies 40A, 40B.

A flame barrier screen 84 is desirably positioned at the top of the upper porous body 40A to prevent unwanted flame propagation between reaction channels, and at the bottom of the lower porous body 40B as well. The components of the reactor 10, including the screen 84 and the upper and lowers bodies 40A and 40B and the central body 20, can be bonded together using a non-chemically-reactive adhesive to seal any small gaps that might exist between components. A suitable coating 68, such as but not necessarily limited to a glaze or colloidal slurry of sinterable particles, is desirably applied to the exterior of the porous bodies 40A and 40B to ensure that the outer skin of the porous bodies 40A and 40B is not itself porous, so as to prevent liquid from escaping through the outer skin of the body.

As an alternative to the flame barrier screen 84, porous plugs 88 may be used, as shown at the bottom of the figure. The porous plugs 88 may be formed by sintering a plug material containing appropriate pore formers, by partially sintering a frit-based plug material, or by other suitable means. Use of porous plugs as flame barriers provides both a flame barrier and a flame barrier seal in one step.

One advantage of this falling film reactor configuration is that the liquid reactant does not need to flow through the flame barrier screen 84, or, in the alternative, through a flame barrier in the form of porous plug 88, so that the flame barrier screen or porous plug does not impede or disturb the formation of a uniform thickness falling film in the reaction channel. Similarly, liquid reaction product is collected by the lower porous extruded body 40B before it reaches the lower flame barrier screen 84 or porous plug flame barrier 88. This ensures that the lower flame barrier screen or porous plug remains dry so that gas reactant flow through the reactor 10 is not impeded.

If desired, the pore size of the porous extruded body may be selected to be smaller than the flame barrier screen mesh size, so as to ensure that any liquid reaction product in contact with both the porous monolith and the lower flame barrier screen will preferentially wick into the porous monolith.

Desirably, the open channels 92 of the bodies 40A and 40B are sized and positioned to match the open channels 22 of the body 20, but a cell size or pitch for the cells 92 differing from that of the cells 22 may be used.

In start up of operation of the reactor 10, the lateral internal channels of the lower porous monolith may be primed with liquid reaction product, if desired, and pumped out at the same or proportional flow rate as liquid reactant entering the upper porous monolith.

While gas flow of either direction may be employed, counterflow gas reactant flow may be desirable because the upward-directed gas flow entering the lower end face of the falling film reactor may help prevent liquid reaction product from flowing downward past the lower porous body collection structure 40B to wet the lower flame barrier screen 84 or porous plug 88.

Figure 12:
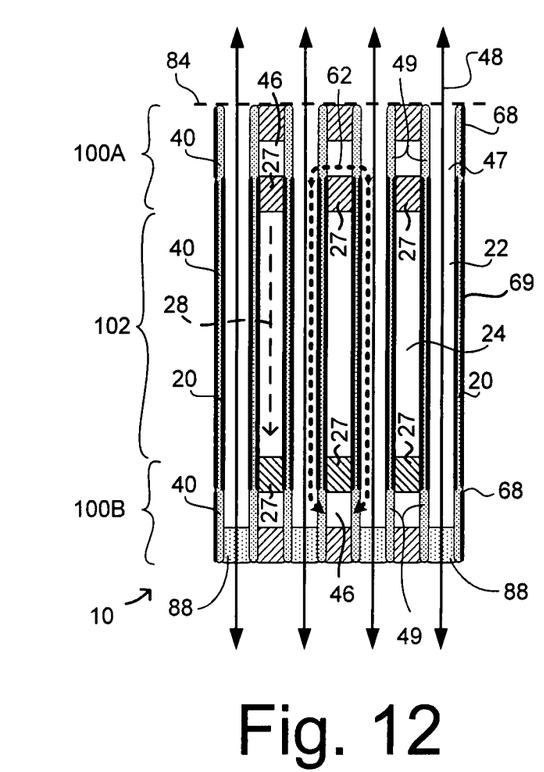
FIG. 12 is a cross-sectional view showing a reactor according to another embodiment of the present invention

An alternative embodiment of the reactor 10 of FIG. 11 is shown in FIG. 12, in which a continuous single porous multicellular extruded body 40 includes a liquid or fluid delivery structure 100A and a liquid or fluid removal structure 100B formed within it. Such a reactor 10 may be formed by coating or impregnating a portion, here the central portion, of the length of the channels of the body 40, with a non-porous material 69, so as to form a non-porous portion 102 of the plurality of channels 86 of the body 40. The non-porous portion 102 being spaced apart, at least by deep plugs 27 as seen in FIG. 12, from the lateral internal passages 46. The deep plugs 27 may be formed by injecting plugging material through a tube into the location to be plugged. An array of injector tubes may be used to speed fabrication.

Figure 13:
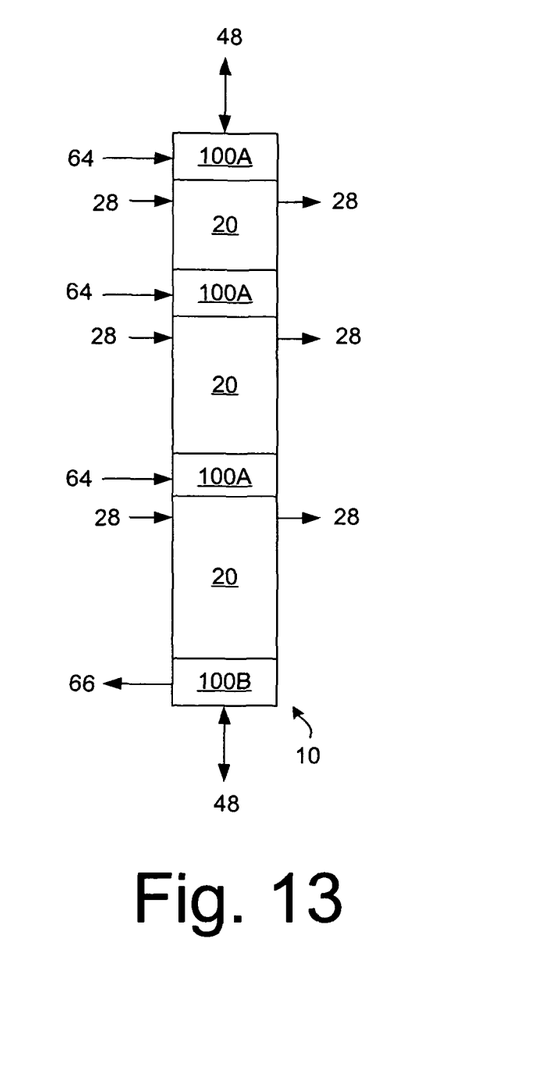
FIG. 13 is a schematic diagram showing a multi-injection reactor according to another embodiment of the present invention.

A multi-injection falling film reactor may be assembled by interposing multiple porous distribution structures 100A at various locations along a falling film reactor, as shown schematically in FIG. 13. Multiple distribution devices 100A provide multiple injection points for multiple input streams 64. A fluid removal device 100B removes the product or the spent fluid at a removal stream 66. Such a multi-injection reactor can be useful to control the rate of reaction, or to establish desirable stoichiometric reaction conditions all along the reactor to improve yield and/or selectivity.

While above description is of falling film reactor fluid distribution and collection using porous honeycomb extrude bodies, similar distribution and collection structures could be formed using a variety of technologies including: porous metal structures that are machined, molded or shaped using other processes such as rapid prototyping to form a fluid distributor or collector; multi-layer laminated ceramic non-porous/porous/non-porous greenware stencils that form the interdigitated structures with porous sidewalls to enable fluid distribution and collection; other fluid guiding, distribution and collection channel structures that are formed by low-cost fabrication processes including stamping, tubular folding, forming and/or clamshell assembly, and porous materials can be deposited on the outer surface of the channel structures where fluids enter or exit the structure to form a flame barrier.

Across all embodiments and variations of the present invention, it is desirable that the one or more passages 28 have a serpentine path back and forth along channels of the second plurality, with the path connecting laterally from channel to channel at or near the ends of the body. By utilizing a serpentine path and interconnecting at or near the ends of the body, the internal channel walls of the body 20 are largely preserved, and the native mechanical properties such as strength, pressure resistance, thermal shock resistance and the like of the body 20 are thus well retained.

Where high flow rates are desired in the path or passages 28 for high heat exchange rates or for other reasons, it is also desirable across all embodiment and variations of the invention that least one of the one or more fluidic passages 28 follows multiple successive respective groups 25 of two or more channels in parallel, in the direction along the channels, as shown and described above with respect to FIG. 5. This provides a higher effective cross section of the passage or path 28, allowing higher flow at a given pressure.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A device for providing fluids to, or removing fluids from, one or more fluid streams, the device comprising: a body having a plurality of channels extending through the body from a first to a second end thereof, the body further having one or more internal passages formed therein extending in a direction crossways to the plurality of channels, wherein each channel is in fluid communication with one or more of the passages, via a porous wall between the respective channel and the respective passage; the one or more passages being in fluid communication with the exterior of the body through a wall of the body, and not through the first or second ends of the body.

2. The device according to claim 1 wherein the body comprises a porous body.

3. The device according to claim 2 wherein an external wall of said body is at least one of (1) coated and (2) impregnated with a non-porous coating.

4. The device according to claim 1 wherein the body comprises an extruded body.

5. The device according to claim 1, wherein the one or more passages are defined in a first direction by opposing walls of the body and in a second direction orthogonal to the first by plugs plugging a gap between said walls.

6. The device according to claim 1 wherein the device further comprises a non-porous portion of the plurality of channels, said portion spaced apart from said passages.

7. The device according to claim 6 further comprising a thermal control fluid passage positioned at least in part within the non-porous portion of the plurality of channels.

8. A method of forming a device for injecting fluids into, or extracting fluids from, one or more fluid streams, the method comprising the steps of
providing a porous extruded body having multiple channels extending through said body from a first end to a second end thereof;
breaching selected interior walls of the porous body so as to join selected ones of the channels thereof so as to produce one or more lateral passages extending in a direction crossways to the direction of the channels; and
plugging the top and bottom of the lateral passages to form enclosed lateral passages.

9. The method of claim 8 further comprising of sealing an external wall of the body by one of (1) coating and (2) impregnating the wall with a non-porous coating.

10. The method of claim 8 further comprising coating or impregnating a respective portion, of the length of the respective channels of the plurality of channels, with a non-porous material so as to form a non-porous portion of the plurality of channels, said portion spaced apart from said passages.

* * * * *